United States Patent
Kerstan et al.

(10) Patent No.: US 7,573,023 B2
(45) Date of Patent: Aug. 11, 2009

(54) ARRANGEMENT AND METHOD FOR COMPENSATION OF THE TEMPERATURE DEPENDENCY OF DETECTORS IN SPECTROMETERS

(75) Inventors: Felix Kerstan, Jena (DE); Ulrich Zeh, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/335,937

(22) Filed: Jan. 20, 2006

(65) Prior Publication Data
US 2006/0163460 A1 Jul. 27, 2006

(30) Foreign Application Priority Data
Jan. 21, 2005 (DE) .................. 10 2005 003 441

(51) Int. Cl.
*H01J 7/24* (2006.01)
(52) U.S. Cl. .................. 250/238; 356/326; 356/330
(58) Field of Classification Search .......... 250/238, 250/239; 356/326, 330
See application file for complete search history.

(56) References Cited

U.S. PATENT DOCUMENTS

| | | | | |
|---|---|---|---|---|
| 3,860,344 A | * | 1/1975 | Garfunkel | 356/51 |
| 3,865,490 A | * | 2/1975 | Grossman | 356/302 |
| 4,043,668 A | | 8/1977 | Goetz et al. | |
| 4,859,858 A | * | 8/1989 | Knodle et al. | 250/504 R |
| 5,153,436 A | * | 10/1992 | Apperson et al. | 250/345 |
| 5,739,905 A | | 4/1998 | Hutchinson | |
| 6,515,285 B1 | | 2/2003 | Marshall et al. | |
| 2002/0056804 A1 | * | 5/2002 | Konagaya | 250/208.1 |
| 2004/0113060 A1 | * | 6/2004 | Nabeyama et al. | 250/238 |

FOREIGN PATENT DOCUMENTS

DE     200 08 622     8/2000

(Continued)

OTHER PUBLICATIONS

Data sheet: "Image Sensors—InGaAs linear image sensor G9211 to 9214 / 9205 to 9208 series", http:///www.hamamatsu.com.

(Continued)

*Primary Examiner*—Stephen Yam
(74) *Attorney, Agent, or Firm*—Reed Smith LLP

(57) ABSTRACT

The present invention is directed to an arrangement and the associated method for the compensation of the temperature dependency of detectors in spectrometers. In the solution according to the invention, the arrangement for compensation of the temperature dependency of detectors in spectrometers comprises an illumination unit, an entrance slit, an imaging grating, a detector and a controlling and evaluating unit. A second temperature gauge for the ambient temperature is provided in addition to an existing first temperature gauge and a temperature regulating unit. In the method according to the invention, a temperature regulating unit is controlled in such a way by a controlling and evaluating unit in the evaluation of the measurement values determined by two temperature gauges that the temperature of the detector remains constant. With the arrangement according to the invention, the cross-influence of the environment on the detector can be compensated so that the stabilization of the detector temperature is improved. Improved stabilization of the detector temperature is ensured by the additional component of ambient temperature.

6 Claims, 2 Drawing Sheets

FOREIGN PATENT DOCUMENTS

EP    0 568 182    11/1993

OTHER PUBLICATIONS

Data sheet: "Subminiature Controller for Thermoelectric Coolers—HY5605", http://www.hytek.com.

Data sheet: "Image Sensors—InGaAs linear image sensor G9211 to 9214 / 9205 to 9208 series", http://www.hamamatsu.com, date unavailable.

Data sheet: "Subminiature Controller for Thermoelectric Coolers—HY5605", http://www.hytek.com, date unavailable.

* cited by examiner

ARRANGEMENT AND METHOD FOR COMPENSATION OF THE TEMPERATURE DEPENDENCY OF DETECTORS IN SPECTROMETERS

CROSS-REFERENCE TO RELATED APPLICATION

This application claims priority of German Application No. 10 2005 003 441.1, filed Jan. 21, 2005, the complete disclosure of which is hereby incorporated by reference.

BACKGROUND OF THE INVENTION a) Field of the Invention

The present invention is directed to an arrangement and accompanying method for compensation of the temperature dependency of detectors in spectrometers. An increased measuring accuracy can be ensured in a broad range of application temperatures by the improved stabilization of the detector temperature.

b) Description of the Related Art

Spectrometers are used in process measurement engineering to determine the concentration or layer thickness of chemical substances. These chemical substances are detected or quantitatively determined on the basis of known or previously measured characteristic spectra.

The sensitivity of the detectors is highly dependent upon temperature, which is an obstacle to broad application. The temperature dependency increases sharply particularly at the long-wave end of the detection range. This is especially critical when the characteristic spectrum of the substance to be determined lies exactly at this long-wave end of the detection range. Therefore, the effort is made to keep the temperature of the detectors constant as far as possible. In order to determine exact measurement values, the stabilization must sometimes be carried out to a fraction of a Kelvin. This can only be realized at great expense because the ambient temperature, which sometimes fluctuates considerably, also has an additional influence on the detectors.

The Utility Model Application DE 200 08 622 U1 describes a sensor device for optical spectroscopy, for example, which enables an online process control. The measurement of the samples is carried out by means of an immersion probe whose optical characteristics are likewise highly dependent upon the temperature of the substance to be examined. When measuring samples at different temperatures, the probe must be kept in the sample for a longer period of time for temperature compensation in order to prevent measurement errors. In order to be able to determine the point in time for temperature compensation, the sensor device has a temperature gauge which makes it possible to carry out a measurement only when temperature compensation has been carried out. While this arrangement ensures that only correct measurements are determined, all-purpose use is impossible due to the lack of temperature compensation.

Further, solutions are known from the prior art in which the temperature of the detector is maintained constant. Detectors of this kind which have a temperature gauge are offered, for example, by HAMAMATSU (data sheet: "Image Sensors—InGaAs linear image sensor G9211 to 9214/9205 to 9208 series", http://www.hamamatsu.com).

In contrast, temperature regulating units with a corresponding control unit are offered by other manufacturers such as HYTEC Microsystems (data sheet: "Subminiature Controller for Thermoelectric Coolers—HY5605", http://www.hytek.com).

Since the temperature gauge is always arranged at a finite distance from the detector rather than on the detector, the exact detector temperature can never be determined.

Solutions of the type mentioned above have the disadvantage that the temperature gauge for the regulating circuit can only be mounted at a finite distance from the detector. Therefore, an absolutely accurate temperature control is never possible. Mass applications cannot be carried out because it is too costly to stabilize the temperature of the detector. On the other hand, the required measuring accuracy cannot be ensured in the application temperature range without stabilizing the temperature of the detector surface.

OBJECT AND SUMMARY OF THE INVENTION

It is the primary object of the present invention to develop a solution for compensation of the temperature dependency of detectors for spectrometers so as to allow the entire spectral range to be made use of, particularly up to the long-wave limit thereof, in spite of changing ambient temperature or detector temperature.

According to the invention, this object is met in an arrangement for compensation of the temperature dependency of detectors in spectrometers, comprising an illumination unit, an entrance slit, an imaging grating, a detector, and a controlling and evaluating unit. A second temperature gauge is provided for ambient temperature in addition to a first temperature gauge and a temperature regulating unit. The illumination unit, the detector, the temperature regulating unit and the two temperature gauges are connected to the controlling and evaluating unit.

With the proposed arrangement and the associated method for compensating the temperature dependency of detectors in spectrometers, the required measuring accuracy is ensured for a wide range of temperatures and broad applicability is made possible.

The invention will be described in the following with reference to embodiment examples.

DESCRIPTION OF THE PREFERRED EMBODIMENTS

Figure 1:
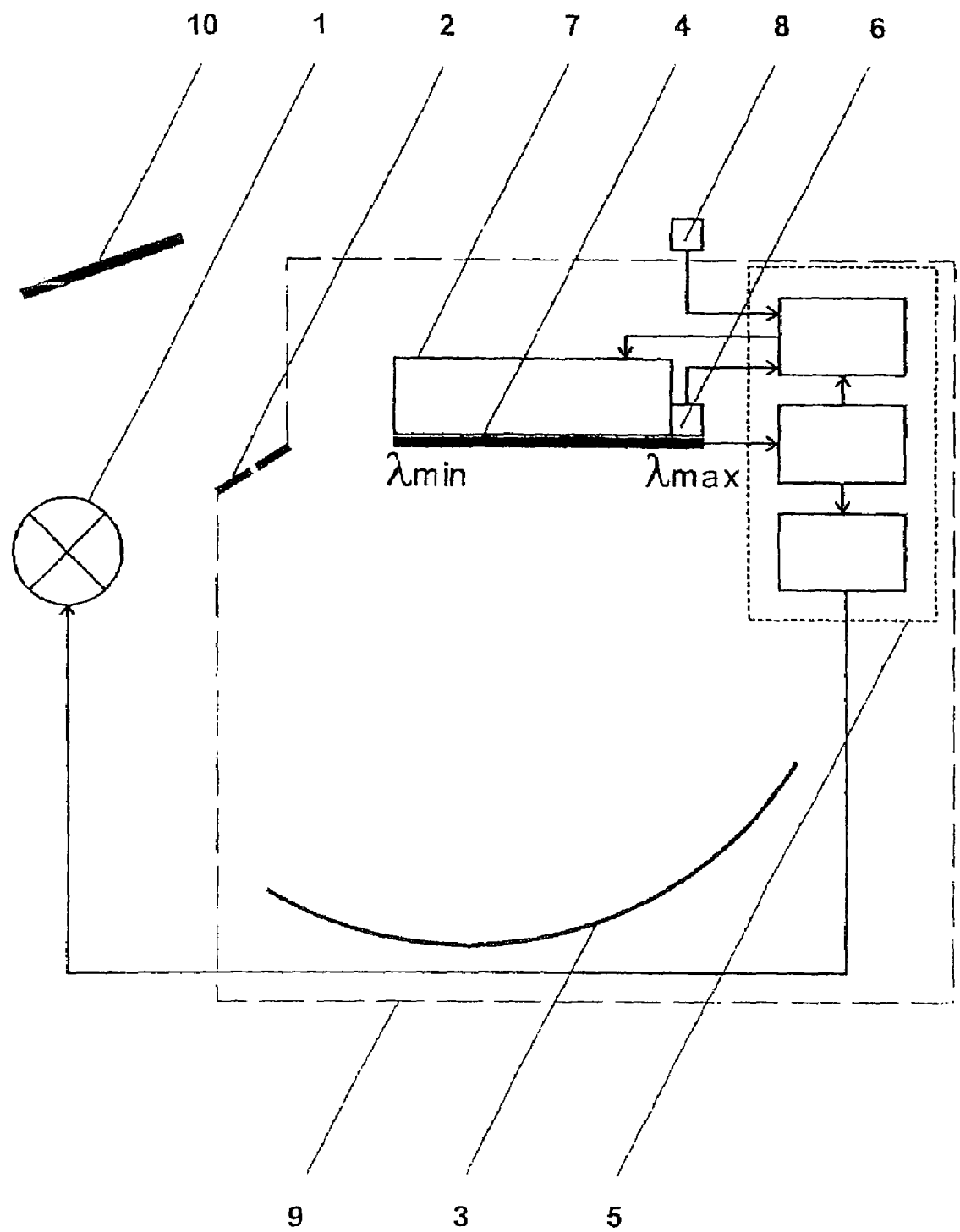
FIG. 1 shows the basic construction of a spectrometer with the arrangement for compensation of temperature dependency of detectors in spectrometers.

The arrangement according to the invention for compensation of the temperature dependency of detectors in spectrometers which is shown in FIG. 1 comprises an illumination unit 1, an entrance slit 2, an imaging grating 3, a detector 4 and a controlling and evaluating unit 5. In addition to a first temperature gauge 6 and a temperature regulating unit 7, the arrangement also has a second temperature gauge 8 for the ambient temperature. The illumination unit 1, the detector 4, the temperature regulating unit 7 and the two temperature gauges 6 and 8 are connected to the controlling and evaluating unit 5. At least the detector 4, the first temperature gauge 6, the temperature regulating unit 7 and the imaging grating 3 are located inside a common housing 9 in which the entrance slit 2 is integrated. Mirror 10 is also shown. The first temperature gauge 6 for determining the detector temperature should preferably be arranged as close as possible to the detector 4, specifically in the vicinity of the long-wave end of the spectrum. The second temperature gauge 8 provided for measuring the ambient temperature is preferably arranged at the outer side of the housing.

In the method according to the invention for compensation of the temperature dependency of detectors in spectrometers, particularly when operating the described arrangement, the temperature regulating unit is controlled in such a way by the controlling and evaluating unit in the evaluation of the measurement value of the detector temperature determined by the first temperature gauge that the temperature of the detector remains constant. In addition, the measurement value of the ambient temperature determined by the second temperature gauge is taken into account by the controlling and evaluating unit in order to supply a corresponding signal to the temperature regulating unit.

In a second embodiment, the output signal of the detector is taken into account by the controlling and evaluating unit in addition in order to supply a corresponding signal to the temperature regulating unit.

In a third embodiment, the measurement value of the ambient temperature determined by the second temperature gauge and the output signal of the detector are taken into account by the controlling and evaluating unit in addition in order to supply a corresponding signal to the temperature regulating unit.

Figure 2:
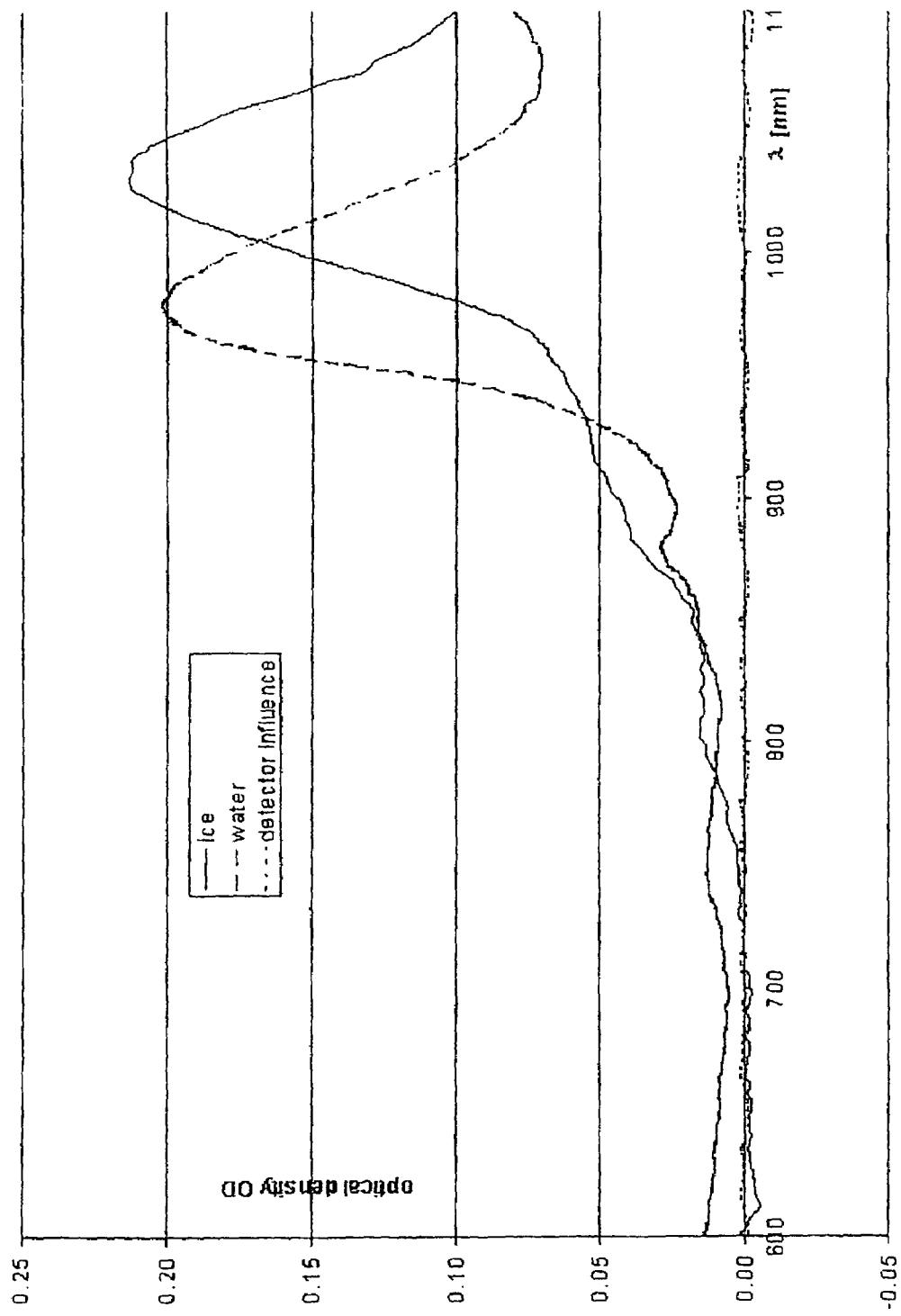
FIG. 2 shows typical spectra of water and ice and the interference spectrum of the temperature change.

FIG. 2 shows typical spectra of water and ice and the interference spectrum of the temperature change. Since all three spectra are significantly different from one another, it is possible to separate the components economically. In the simplest case, this is possible by means of linear compensation calculation.

A change in the spectrum due to a change in temperature behaves like an additional chemical component with a characteristic spectrum. This can be calculated from the detector data as well as in a climatic chamber.

The advantage of the arrangements according to the invention consists in that the correcting influence of the second temperature gauge (ambient temperature) can be checked or corrected at any time based on the spectrum of an invariable sample (e.g., a standard sample).

With the arrangement according to the invention and the temperature gauge for the ambient temperature, the cross-influence of the environment on the detector temperature sensor can be compensated so that the stabilization of the detector temperature is improved. The stabilization of the detector temperature can be further improved when the controlling and evaluating unit takes the detector signal into account in addition in order to generate a corresponding signal for controlling the temperature regulating unit.

The proposed solution in which the additional component of ambient temperature is introduced in order to ensure an improved stabilization of the detector temperature can be used in all known methods of spectral analysis. The additional temperature gauge required for this purpose is fastened to the outside of the housing of an existing spectrometer arrangement and is connected to the controlling and evaluating unit which must be adapted in a corresponding manner.

While the foregoing description and drawings represent the present invention, it will be obvious to those skilled in the art that various changes may be made therein without departing from the true spirit and scope of the present invention.

What is claimed is:

1. An arrangement for compensation of the temperature dependency of detectors in spectrometers, comprising:
   an illumination unit;
   an entrance slit;
   an imaging grating;
   a detector;
   a controlling and evaluating unit;
   a second temperature gauge for detecting the ambient temperature of said detector being provided in addition to a first temperature gauge and a temperature regulating unit; and
   said illumination unit, said detector, said temperature regulating unit and said temperature gauges being connected to the controlling and evaluating unit.

2. The arrangement according to claim 1, wherein at least the detector, the first temperature gauge, the temperature regulating unit and the imaging grating are located inside a common housing in which the entrance slit is integrated.

3. The arrangement according to claim 1, wherein the second temperature gauge for measuring the ambient temperature is arranged at the outer side of the housing.

4. A method for compensation of the temperature dependency of detectors in spectrometers, in operating an arrangement according to claim 1, including the steps of:
   controlling the temperature regulating unit in such a way by the controlling and evaluating unit in evaluating the measurement value of the detector temperature determined by the first temperature gauge that the temperature of a detector remains constant; and
   taking into account the measurement value of the ambient temperature determined by the second temperature gauge by the controlling and evaluating unit in order to supply a corresponding signal to the temperature regulating unit.

5. A method for compensation of the temperature dependency of detectors in spectrometers, including the steps of:
   providing an illumination unit;
   providing an entrance slit;
   providing an imaging grating;
   providing a detector;
   providing a controlling and evaluating unit;
   providing a second temperature gauge for detecting the ambient temperature of said detector being provided in addition to a first temperature gauge and a temperature regulating unit;
   providing said illumination unit, said detector, said temperature regulating unit and said temperature gauges being connected to the controlling and evaluating unit;
   controlling the temperature regulating unit in such a way by the controlling and evaluating unit in evaluating the measurement value of the detector temperature determined by the first temperature gauge that the temperature of the detector remains constant; and
   taking into account the output signal of the detector by the controlling and evaluating unit in addition in order to supply a corresponding signal to the temperature regulating unit.

6. A method for compensation of the temperature dependency of detectors in spectrometers, including the steps of:
   providing an illumination unit;
   providing an entrance slit;
   providing an imaging grating;
   providing a detector;
   providing a controlling and evaluating unit;
   providing a second temperature gauge for detecting the ambient temperature of said detector being provided in addition to a first temperature gauge and a temperature regulating unit;

providing said illumination unit, said detector, said temperature regulating unit and said temperature gauges being connected to the controlling and evaluating unit;

controlling the temperature regulating unit in such a way by the controlling and evaluating unit in evaluating the measurement value of the detector temperature determined by the first temperature gauge that the temperature of the detector remains constant; and additionally taking into account the measurement value of the ambient temperature determined by the second temperature gauge and the output signal of the detector by the controlling and evaluating unit in order to supply a corresponding signal to the temperature regulating unit.

* * * * *